United States Patent [19]
Ceccarelli

[11] 3,931,741
[45] Jan. 13, 1976

[54] COMBINED MEASURING SPOON AND RECEPTACLE

[76] Inventor: Jovanna Ceccarelli, F.D.R. Station, P.O. Box 1564, New York, N.Y. 10022

[22] Filed: Nov. 2, 1973

[21] Appl. No.: 412,201

[52] U.S. Cl............. 73/427; 215/DIG. 5; 229/1.5 C
[51] Int. Cl.² ......................................... G01F 19/00
[58] Field of Search ............................. 73/426–428; 30/125, 324, 326–327; 215/DIG. 5; 229/1.5 C

[56] References Cited
UNITED STATES PATENTS

| | | | |
|---|---|---|---|
| 2,174,388 | 9/1939 | Myers | 30/328 |
| 2,487,274 | 11/1949 | Schaffer | 30/327 X |
| 2,597,275 | 5/1952 | Ahlstrand | 30/327 X |
| 3,063,110 | 11/1962 | West | 30/327 X |
| 3,334,778 | 8/1967 | Saunders | 229/1.5 C |
| 3,369,407 | 2/1968 | Hein | 73/427 |

Primary Examiner—Richard C. Queisser
Assistant Examiner—Daniel M. Yasich

[57] ABSTRACT

Absolute, determinable, engraved, leveling instrument noting exact measurements for liquid measure begins to describe this MEDI-SPOON; but more specifically, one of it's main purposes, is for measuring liquid medicine from small dose to large dose in one utensil comprised of a bowl and a handle. Bowl of the measuring spoon is narrow and elongated with engraved concentric lines that appropriately mark each measurement and bear the following inscribed indicia: one-fourth tea; one-half tea; 1 tea; 1 Tablespoon, to indicate and achieve accurate measurements. The safety zone, the space between the edge of the spoon to the limiting line of the tablespoon, prevents overflow and permits the full measure of the tablespoon to be poured without running over the brim. Obiter dicta: the bowl and the handle is a hinged stem connecting the two; the leveling handle of the spoon is a hollow elongated member whose shape may be circular, rectangular, trapezoidal or any other adaptable shape, with a removable screw cap at the outer end whose length and circumference is large enough to contain a vial or vials of liquid medicine; unfolded, the handle has the ability of leveling; the handle also folds over the bowl for storage or convenient carrying. Enhancement of the Medi-Spoon in silver or gold would be desirable, but it can be manufactured in tin, stainless steel, or plastic, or any other suitable material. A clear vial with marked measures is housed in the hollow screw cap handle of each MEDI-SPOON.

1 Claim, 7 Drawing Figures

U.S. Patent  Jan. 13, 1976  3,931,741
FIG. 1.
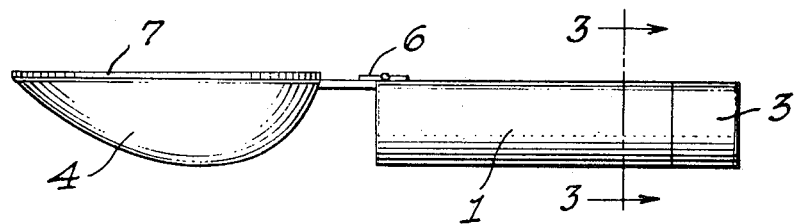
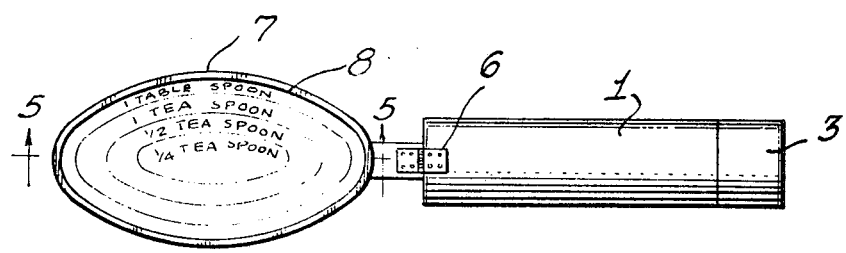
FIG. 2.
FIG. 3
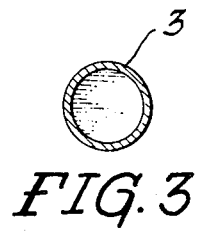
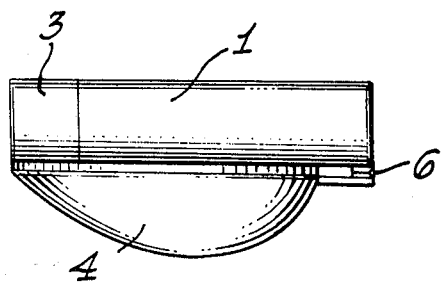
FIG. 4.
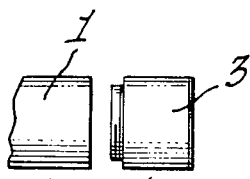
FIG. 6.
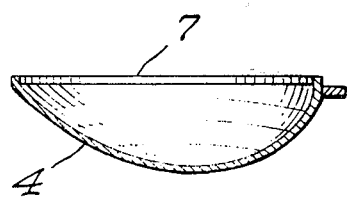
FIG. 5.
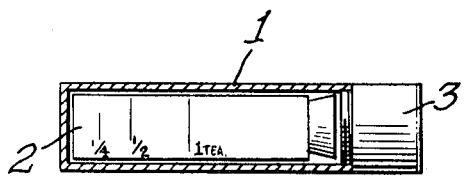
FIG. 7.

COMBINED MEASURING SPOON AND RECEPTACLE

The object of my invention is for the MEDI-SPOON to be "the be-all and the end-all" of liquid medicine measuring spoons, in performance, accuracy of measurement, simpliciity and beauty of design, easy to use and convenient for use at home or away from home.

This invention relates to a unique and novel item. In observing the bowl, we see first, the shape of the bowl is narrow and elongated with a modern, sleek, new look, an object of the invention.

Then, inside the bowl there are four impressed concentric lines to indicate each measurement — one quarter teaspoon, one half teaspoon, one teaspoon and one table-spoon to achieve accurate measurements for each measurement, an object of the invention. While it has been shown as a tablespoon, it may be any other convenient measure or fraction thereof, for instance, a teaspoon for children.

And, then, beyond the perimeter of the impressed limiting line of the tablespoon measure, to the edge of the spoon, there is a margin, distinguished by the name of "Safety Zone," room to spare, that permits the full measure of the tablespoon to be poured without running over the brim, a safety spill feature to prevent overflow and an important object of the invention. This is achieved without extra embellishment.

The sleek modern design of the narrow shaped bowl is not only beautiful in appearance but its shape fits the mouth more naturally and cuts down on the need to stretch out the mouth and tense up the muscles, an object of this invention. Especially if the medicine is bad tasting, a distortion of the mouth together with the hard to take medicine could cause one to choke.

The bowl of the spoon is free of the handle in order to achieve the truly safety spill feature to prevent overflow. There is a complete border of space around and above the entire limiting line of the tablespoon measure, right to the very smooth edge of the MEDI-SPOON, in a self-contained bowl with an interdependent handle. The bowl of the spoon is dependent on its counterpart, the handle, for its complete function and performance for it is the connection of the handle that achieves level measurements in the bowl, an object of this invention.

Between the bowl and the handle there is a cylinder-like stem that connects the two with a snug, tight fitting friction hinge that allows the handle to fold over the spoon but in its open condition, when it is flat, it provides a horizontal level condition for the bowl, an object of this invention.

The handle is a hollow elongated member whose shape is optional, including circular, rectangular, trapezoidal, square, or any polygon shape or other adaptable shape, with a removable screw cap at the outer end, making it a container that could be used for several conveniences, an object of this invention.

The handle of the MEDI-SPOON is not just a handle. Besides being a handle, it has the ability of leveling, it is a container, and it folds — all objects of this invention.

A clear vial marked with measures is enclosed in the hollow handle. In the event that medication needs to be taken away from home, dosages can be readily available, since it can be carried in the vial housed in the handle of the MEDI-SPOON, an object of this invention.

The MEDI-SPOON in addition to its being a precise liquid medicine measure, provides a modern, unique, compact, useful means of conserving medicine by preventing over-flow and loss of even the merest particle whose loss would interfere with the proper remedial effects. Not only does the MEDI-SPOON provide for specific dosages, but it also insures no wastage of costly and precious medicine. Especially for the aged, indigent and Medicare patients, and in cases where an individual may be in a weakened state and alone, the MEDI-SPOON may be placed on a flat surface and since its unique handle makes for level balance, it is unnecessary to hold both the medicine bottle and the MEDI-SPOON in the hands simultaneously.

Not only is it distressing, costly and dangerous to lose medicine through spillage, but it is also costly and aggravating to replace or clean objects marked, stained or ruined by spillage. Ease of administration is guaranteed and the experience of taking medicine becomes less traumatic when the fear of spillage is removed.

Sanitary administration of medicine is of utmost importance. In hospitals, disposable plastic ones could be used for each patient to insure sanitary conditions. For home use, one's name could be engraved on the handle making it very personal.

The drawing is not the limit, merely an illustration of the preferred embodiment:

FIG. 1 Side elevational view

FIG. 2 Top plan view

FIG. 3 Is a cross sectional view taken along line 3—3 in FIG. 1

FIG. 4 Is a side elevational view of the invention in a closed position

FIG. 5 Is a cross sectional view taken along line 5—5 in FIG. 2

FIG. 6 Is a fragmentary view of the handle with the cap removed

FIG. 7 Is an inside view of the hollow handle container housing a removeable, clear, measuring vial The following information refers to and describes the Figures in the drawing:

FIG. 1 is comprised of a bowl 4 adjoined to a leveling handle 1 consisting of a hollow elongated member, the first end of which includes a tight fitting friction hinge 6 that fastens to the stem means to connect to the bowl 4 of said spoon and a second open end, a closure with screw cap 3, means the outer end of said container handle 1 and said handle 1 when in an open state lying in a plane, provides a horizontal level condition for said bowl 4 and indicating lines of said bowl 4.

FIG. 2 illustrates the sleek, narrow, elongated bowl 4 as shown from a top view is comprised of a measuring portion divided into fractions by impressed indicating lines concentric to each other with inscribed indicia to indicate accurate measurements for one-fourth tea, one-half tea, 1 tea, and 1 tablespoon; wherein the maximum measure indicating line is slightly within the edge 7–8 of said bowl 4 and is created by sizing said spoon slightly larger than the average tablespoon without the addition of extra embellishment and that the marginal space between the tablespoon marking 7 and the edge 8 of said spoon means said safety-zone between 7–8 prevents overflow and inhibits the spillage of the full tablespoon measure.

FIG. 3 shows a cross section of the hollow handle 1 and said hollow handle 1 as illustrated is shaped round 3 means that said hollow handle 1 may be optionally shaped to include rectangular, trapezoidal, square or any polygon or other adaptable shape.

FIG. 4 shows that the friction hinge 6 fastened to the stem of said spoon permits the hollow handle 1 to fold over the bowl 4 means said hollow handle 1 can be put in a folded condition.

FIG. 5 shows bowl 4 has impressed measurements (one-fourth tea, one-half tea, 1 tea, 1 tablespoon) with a marginal space that creates a safety-zone rim 7–8 means that a complete border of marginal space encircles said bowl 4 and that the safety-zone rim 7–8 is free from the stem that is connected to said bowl 4.

FIG. 6 illustration shows hollow handle 1 with screw cap 3 removed means said hollow handle 1 with removeable screw cap 3 provides an opening to space within said hollow handle 1 making said hollow handle 1 a container.

FIG. 7 shows housed in the hollow container handle 1 with removeable screw cap 3 a removeable vial 2 containing indicia means said vial container could be used for carrying measured liquid or medicine, or could be used for carrying other items such as pills, lozenges, tablets, etc.

The preceeding information, verbal and graphic describes this invention. It is the intention of the inventor to append the following claims which fall within the domain of said invention in order to protect whatever changes and modifications may be deemed necessary in the course of the present and future production and use of this MEDI-SPOON. The improvements of this Combined Measuring Spoon and Receptacle are unique, novel, useful and convenient. For all the reasons stated, I believe the device to be the absolute accurate medicine or liquid measurer and a necessary and welcome invention.

What is claimed as unique in this modern, accurate, sanitary, convenient, useful, and compact all-in-one implement is:

1. An accurate liquid measuring spoon device for medicine dosing and the like comprising a bowl and a handle, said bowl being narrow and elongated and said bowl comprises a spoon having a measuring portion impressed with indicating lines substantially concentric to each other, said measuring portion delimiting the quantity of a medicine dose at one fourth teaspoon, one-half teaspoon, 1 teaspoon and 1 tablespoon, an additional margin is provided between the tablespoon indicating line and the terminal edge of the bowl, to function as a safety zone to prevent spillage, said bowl of said spoon connected to said handle by a stem at the end opposite the closure end of said handle, said handle consisting of a hollow elongated member having the same depth as said bowl, the bottom center portions of the bowl and handle of said spoon being polished to prevent rocking, said hollow handle serving as a horizontal leveling device for said bowl of said spoon when lying in a plane on a flat surface in an open condition, the closure end of said handle openable by means of a screw cap permitting access to said hollow member, a tight fitting friction hinge fastened to said stem of said spoon connecting said bowl and said handle to permit said handle to fold over;

said bowl for carrying, thereby providing a compact unit, that can be easily stored and transported, said hollow container handle and said screw cap serving to enclose a permanently made, removeable, transparent, graduated measuring vial therein, or which alternatively could be used, selectively contain liquids, medicated or otherwise, or such items as capsules, pills, lozenges, thermometer and any other suitable item for storage, for carrying or both.

* * * * *